United States Patent
McIntosh

(10) Patent No.: US 11,270,254 B2
(45) Date of Patent: Mar. 8, 2022

(54) RECOGNITION FEATURES FOR A CONSUMABLE ARTICLE

(71) Applicant: THE BOEING COMPANY, Chicago, IL (US)

(72) Inventor: Darren Carl McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 202 days.

(21) Appl. No.: 16/243,668

(22) Filed: Jan. 9, 2019

(65) Prior Publication Data
US 2020/0219041 A1  Jul. 9, 2020

(51) Int. Cl.
| G06K 7/10 | (2006.01) |
| A47K 10/16 | (2006.01) |
| A47K 10/32 | (2006.01) |
| G06K 19/06 | (2006.01) |
| G06Q 10/08 | (2012.01) |
| G06K 19/07 | (2006.01) |
| H04B 1/03 | (2006.01) |
| H04B 1/06 | (2006.01) |

(52) U.S. Cl.
CPC .......... *G06Q 10/087* (2013.01); *A47K 10/16* (2013.01); *A47K 10/32* (2013.01); *G06K 7/10297* (2013.01); *G06K 19/0723* (2013.01); *H04B 1/03* (2013.01); *G06K 2007/10504* (2013.01); *G06K 2019/06253* (2013.01); *H04B 1/06* (2013.01)

(58) Field of Classification Search
CPC .......... G06K 19/0723; G06K 7/10297; G06G 10/087; H04B 1/03; H04B 1/06
See application file for complete search history.

(56) References Cited

U.S. PATENT DOCUMENTS

| 5,249,755 | A | * | 10/1993 | Jespersen | ............... A47K 10/38 242/596.7 |
| 5,504,573 | A | * | 4/1996 | Cheiky-Zelina | ... G01N 15/0266 250/301 |
| 6,478,229 | B1 | * | 11/2002 | Epstein | ............ G06K 19/07749 235/492 |
| 6,578,728 | B1 | * | 6/2003 | Weigen | .................. A47K 10/38 221/135 |
| 6,836,215 | B1 | * | 12/2004 | Laurash | .................... G06K 1/12 340/572.1 |
| 7,044,421 | B1 | * | 5/2006 | Omdoll | .................. A47K 10/36 242/563 |
| 8,292,173 | B2 | * | 10/2012 | Yturralde | ........... G06K 19/0776 235/385 |
| 9,697,711 | B2 | | 7/2017 | McIntosh | |
| 10,238,246 | B2 | * | 3/2019 | Cittadino | ................ A47K 10/38 |
| 2002/0063037 | A1 | * | 5/2002 | Bruun | .................... B65G 47/52 198/370.01 |

(Continued)

FOREIGN PATENT DOCUMENTS

AU  2011253961 B2  1/2012
JP  11216082 A  *  8/1999

*Primary Examiner* — Daniel I Walsh
(74) *Attorney, Agent, or Firm* — Coats & Bennett, PLLC

(57) ABSTRACT

Methods, systems, and apparatuses are disclosed for providing physical validation of for precluding improper installation and confirming appropriate installation of a consumable articles into a consumable article dispenser, and further monitoring the appropriate installation and consumption of a consumable article in real-time.

27 Claims, 7 Drawing Sheets

(56) References Cited

U.S. PATENT DOCUMENTS

| | | | |
|---|---|---|---|
| 2002/0096597 A1* | 7/2002 | Adelakun | A47K 10/3836 242/588.6 |
| 2003/0078691 A1* | 4/2003 | Holt | A47K 10/38 700/139 |
| 2003/0089444 A1* | 5/2003 | Melzer | G06K 19/07749 156/64 |
| 2003/0213809 A1* | 11/2003 | Weigen | A47K 10/38 221/2 |
| 2005/0121898 A1* | 6/2005 | Laackmann | G06K 19/07 283/70 |
| 2005/0145745 A1* | 7/2005 | Lewis | A47K 5/06 242/563 |
| 2005/0171634 A1* | 8/2005 | York | G16H 40/20 700/231 |
| 2006/0060657 A1* | 3/2006 | Choong | G06K 19/077 235/492 |
| 2006/0173576 A1* | 8/2006 | Goerg | A47K 10/3662 700/236 |
| 2006/0217820 A1* | 9/2006 | Holt | G06Q 10/087 700/46 |
| 2006/0290500 A1* | 12/2006 | Sagawa | G06Q 10/06 340/572.1 |
| 2007/0187501 A1* | 8/2007 | Lenkl | B65C 9/40 235/451 |
| 2007/0210924 A1* | 9/2007 | Arnold | B31D 1/021 340/572.8 |
| 2007/0221077 A1* | 9/2007 | Lenkl | B41J 3/4075 101/288 |
| 2008/0035696 A1* | 2/2008 | Nichols | B65H 35/002 225/19 |
| 2008/0077649 A1* | 3/2008 | Barker | H04L 29/12783 709/202 |
| 2009/0140001 A1* | 6/2009 | Lewis | A47K 10/3662 221/13 |
| 2009/0250484 A1* | 10/2009 | Kling | B65H 35/0066 221/14 |
| 2010/0180547 A1* | 7/2010 | Foucher | A47F 1/04 53/411 |
| 2010/0269653 A1* | 10/2010 | Larsson | A47K 10/3625 83/72 |
| 2010/0286817 A1* | 11/2010 | Goeking | A47K 10/26 700/231 |
| 2011/0050426 A1* | 3/2011 | Choong | G06K 19/07749 340/572.1 |
| 2011/0133010 A1* | 6/2011 | Pelland | A47K 10/16 242/160.4 |
| 2011/0147467 A1* | 6/2011 | Choi | G06K 19/07327 235/492 |
| 2011/0285507 A1* | 11/2011 | Nelson | G06K 19/0739 340/10.1 |
| 2011/0304433 A1 | 12/2011 | Molewyk et al. | |
| 2012/0043409 A1* | 2/2012 | Takei | B65H 19/126 242/599 |
| 2012/0109366 A1* | 5/2012 | Lowery | A47K 10/36 700/231 |
| 2012/0167739 A1* | 7/2012 | Lewis | B26F 3/02 83/663 |
| 2013/0043265 A1* | 2/2013 | Hagleitner | A47K 10/36 221/1 |
| 2014/0197192 A1* | 7/2014 | Atkins | A47K 5/1211 222/23 |
| 2015/0317896 A1* | 11/2015 | Planton | G06K 19/0717 340/584 |
| 2016/0227970 A1* | 8/2016 | Diamond | B65H 35/0086 |
| 2017/0057775 A1* | 3/2017 | Kobs | A47K 10/38 |
| 2017/0254060 A1* | 9/2017 | Hall | A47K 10/38 |
| 2020/0219041 A1* | 7/2020 | McIntosh | H04B 1/03 |

\* cited by examiner

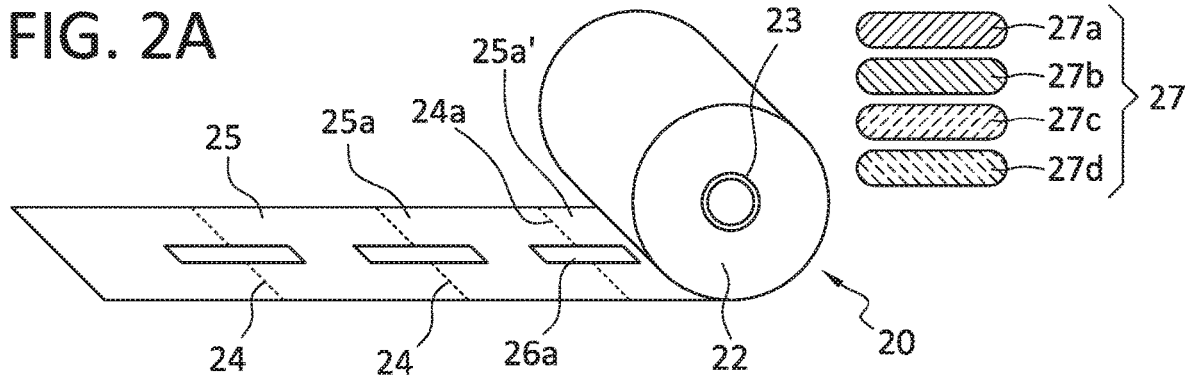
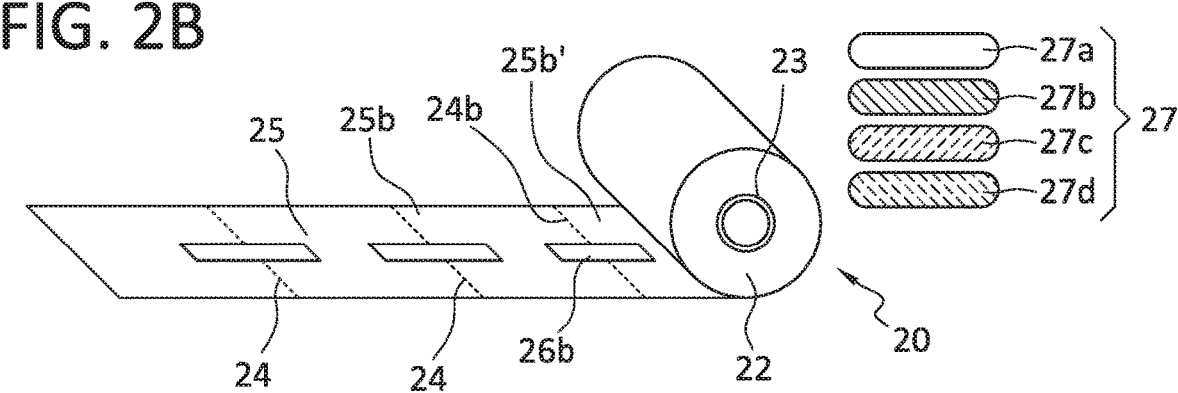
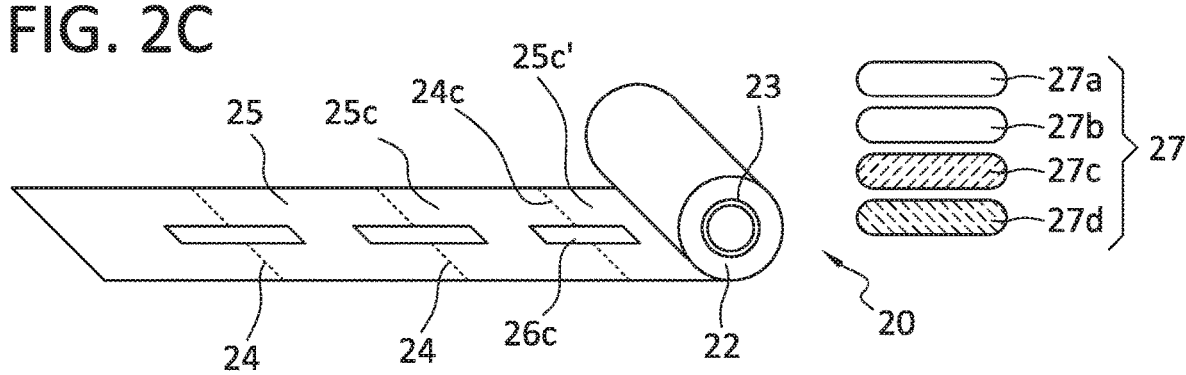
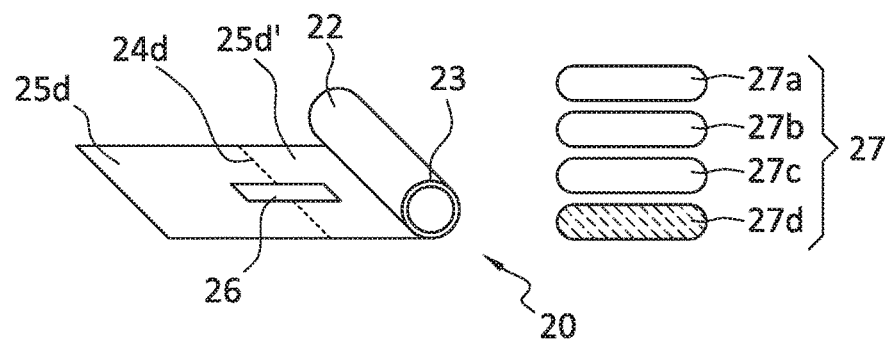

RECOGNITION FEATURES FOR A CONSUMABLE ARTICLE

TECHNOLOGICAL FIELD

The present disclosure relates generally to the field of consumable articles. More specifically the present disclosure relates to confirming the appropriate placement and acceptance of refillable consumable articles into a respective dispensing arrangement, and monitoring the consumption of, and state of consumable articles and their usage and/or supply, in real-time.

BACKGROUND

A wide variety of products are dispensed from dispensers resulting in the need to refill such dispensers. Such dispensed products that are "consumed" are referred to generally as "consumables". Such consumables can be dispensed in solid, liquid or aerosol form. When the supply of such consumables runs low or is exhausted, such consumables must be replaced with a new supply, if further dispensing is desired. Certain regulatory mandates can impact the quality or permitted characteristics of various consumables, and the control of the quality of, or characteristics of, replacement consumables introduced into a dispenser can become important.

Further, it may be important to detect the use of various consumables, or otherwise monitor the usage of various consumables, for example, for the purpose of avoiding down time of a particular dispenser that has "run out" of a particular consumable, or to facilitate servicing the distribution of various consumables according to routine or otherwise scheduled dispenser maintenance, servicing, etc.

SUMMARY

According to a present aspect, a system for monitoring a consumable article is disclosed, with the system including a consumable article dimensioned to be received into a dispenser, with the consumable article including an embedded transmitter configured to send a signal to a receiver, a dispenser for dispensing the consumable article, with the dispenser dimensioned to receive the consumable article. The dispenser further includes a receiver configured to receive the signal sent from the transmitter.

According to a further aspect, the signal is a passive signal.

In another aspect, the dispenser further includes a protrusion or recess, with the protrusion or recess dimensioned to mate with a matching or reciprocal protrusion or recess in the consumable article.

In another aspect, the consumable article further includes a protrusion or recess dimensioned to mate a matching or reciprocal protrusion or recess in the dispenser.

A further present aspect is directed to a consumable article, with the consumable article including an embedded transmitter and at least one registration feature configured to mate with a dispenser.

In another aspect, the embedded transmitter includes a RFID (radio frequency identification) chip, with the RFID chip including a frangible circuit.

A further aspect is directed to a method for monitoring a consumable article, with the method including directing a consumable article into a dispenser. The consumable article includes an embedded transmitter configured to send a signal. The consumable article further includes a protrusion or recess dimensioned to mate with a dispenser. The dispenser includes a receiver for receiving the signal sent by the embedded transmitter embedded in the consumable article, and the dispenser is further dimensioned to mate with the consumable article. The method further comprises sending a signal from the embedded transmitter to the receiver, with the receiver in communication with a controller, and confirming installation of the consumable article into the dispenser.

According to another aspect, a method is disclosed further including monitoring the consumption of the consumable article.

In another aspect, disclosed methods further include monitoring the condition of the embedded transmitter, and the embedded transmitter includes a frangible circuit.

In another aspect, disclosed methods further include indicating the state of the consumable article as evidenced by the breaking of a frangible circuit in an embedded transmitter.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1A:
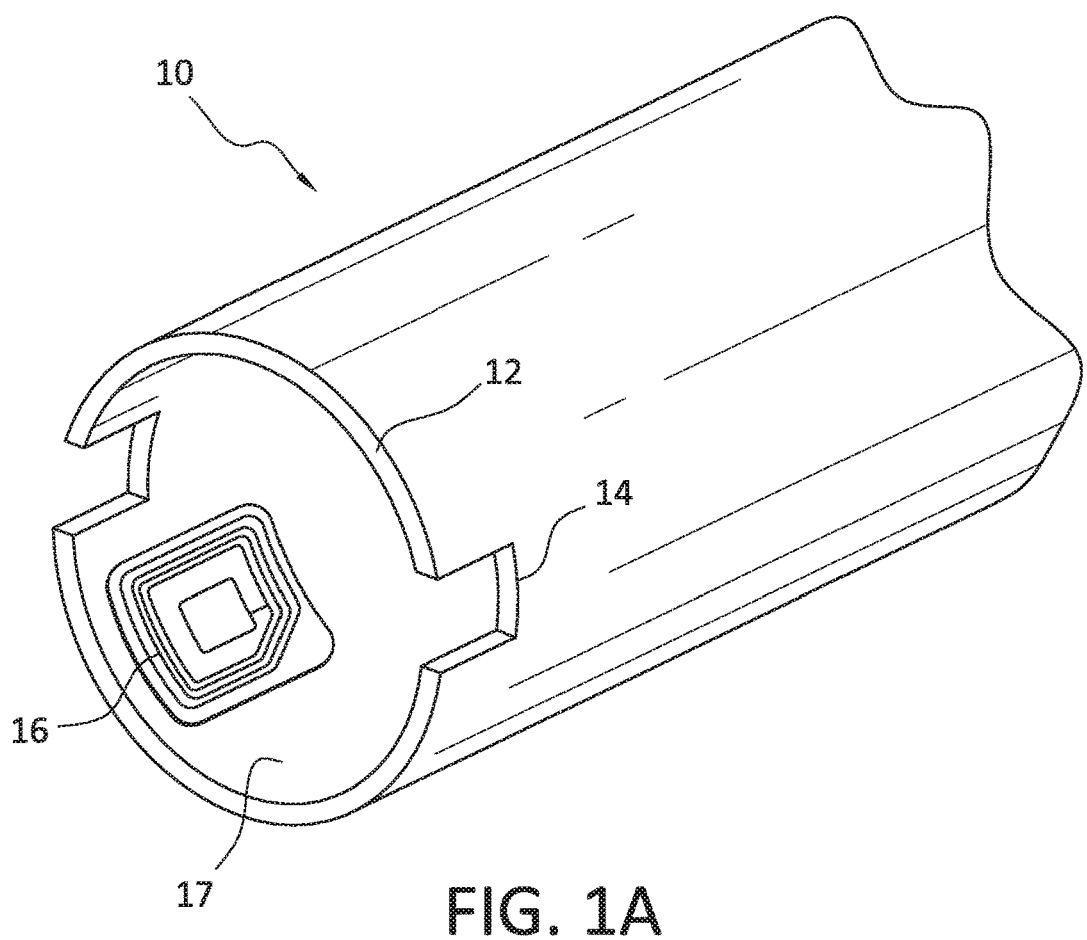
Figure 1B:
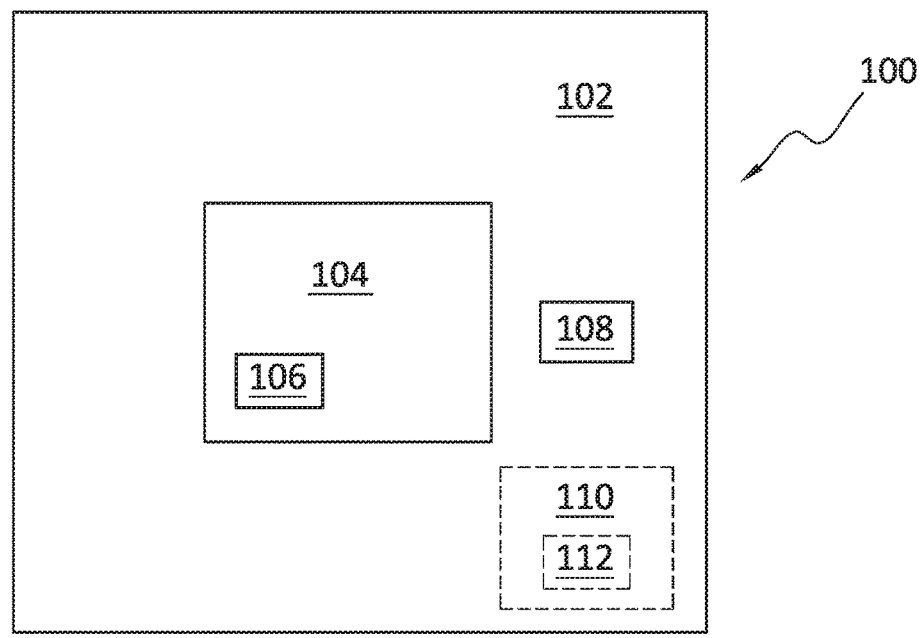
Figure 2E:
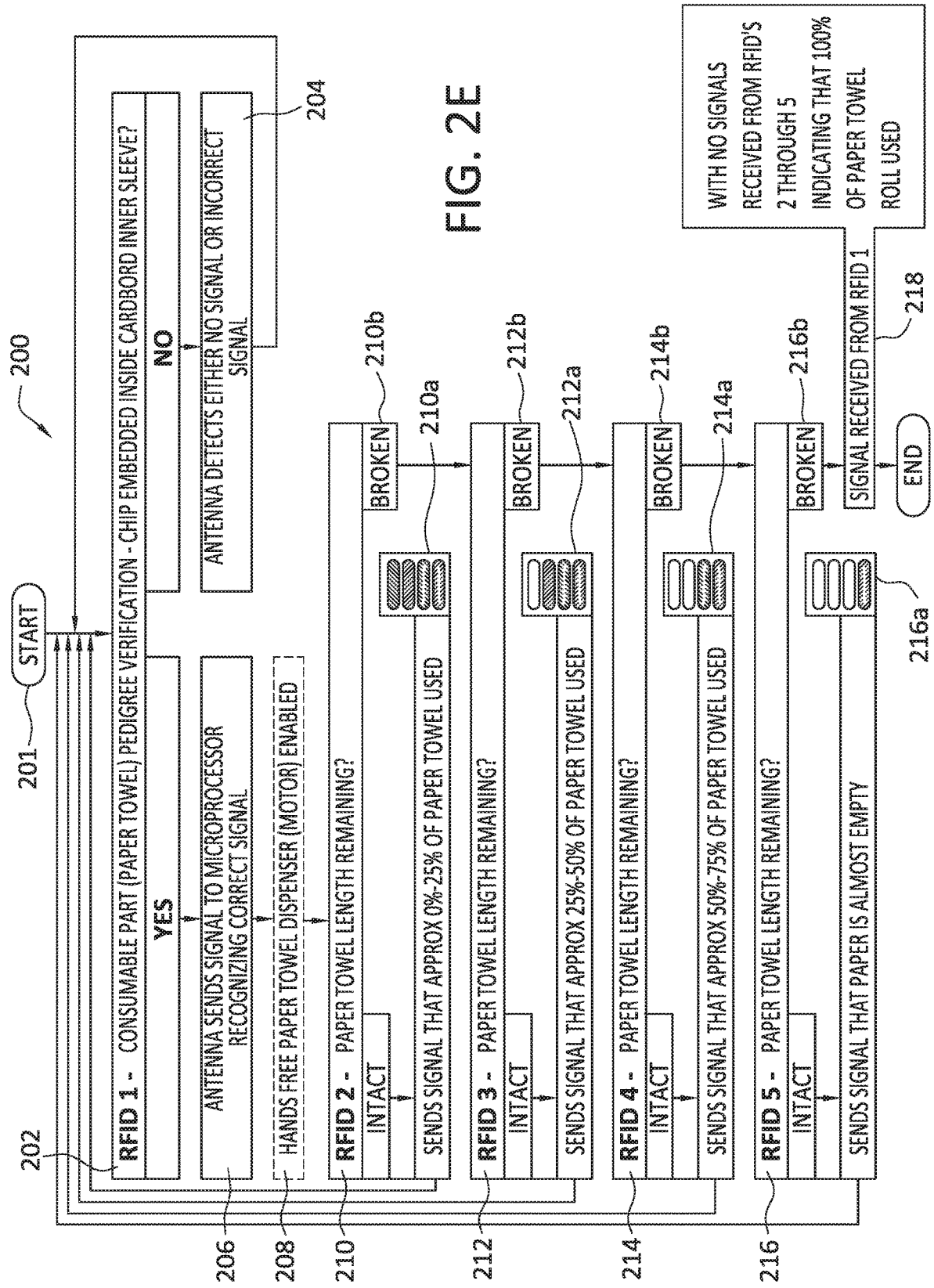
Figure 3:
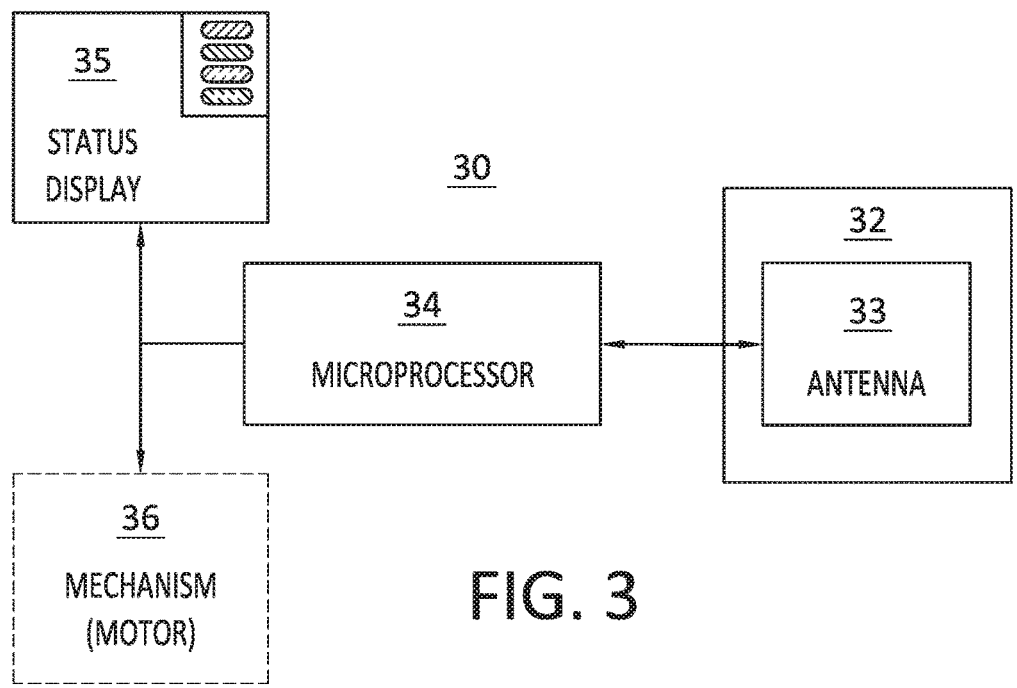
Figure 4:
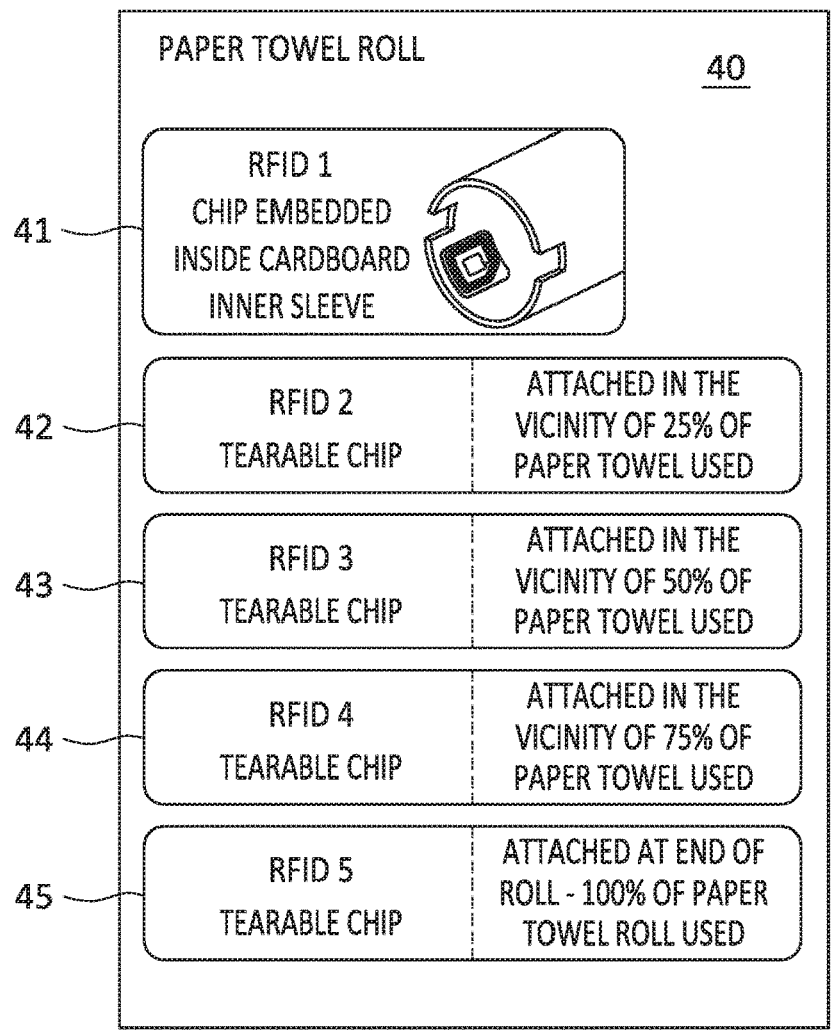
Figure 5A:
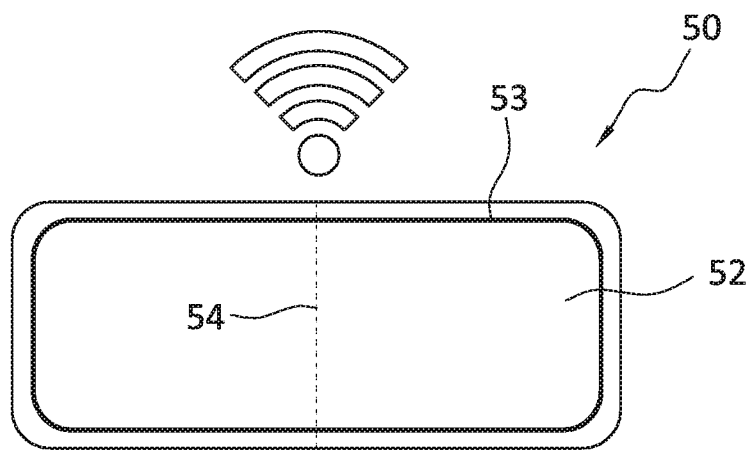
Figure 5B:
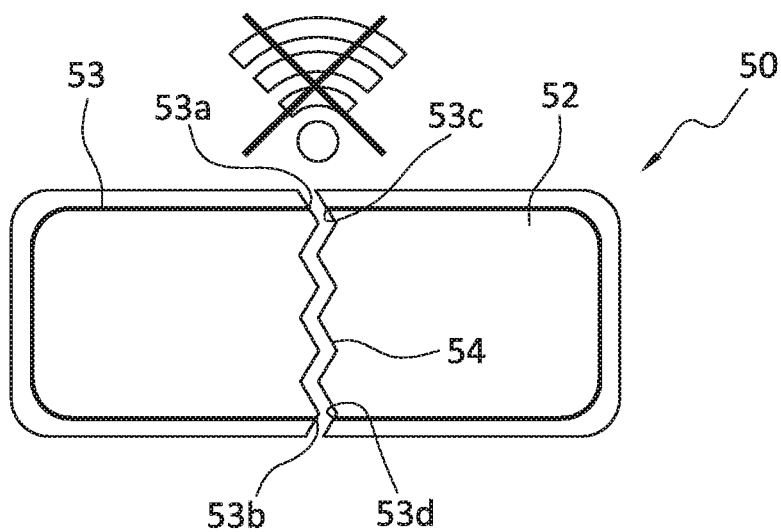
Figure 6:
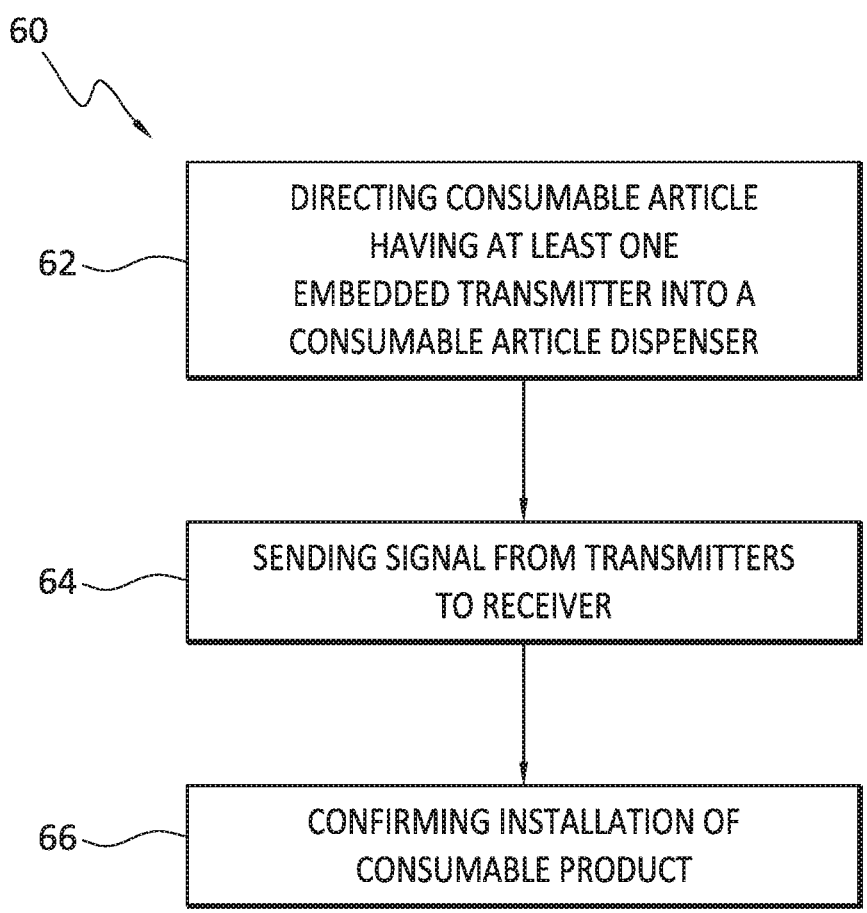
Figure 7:
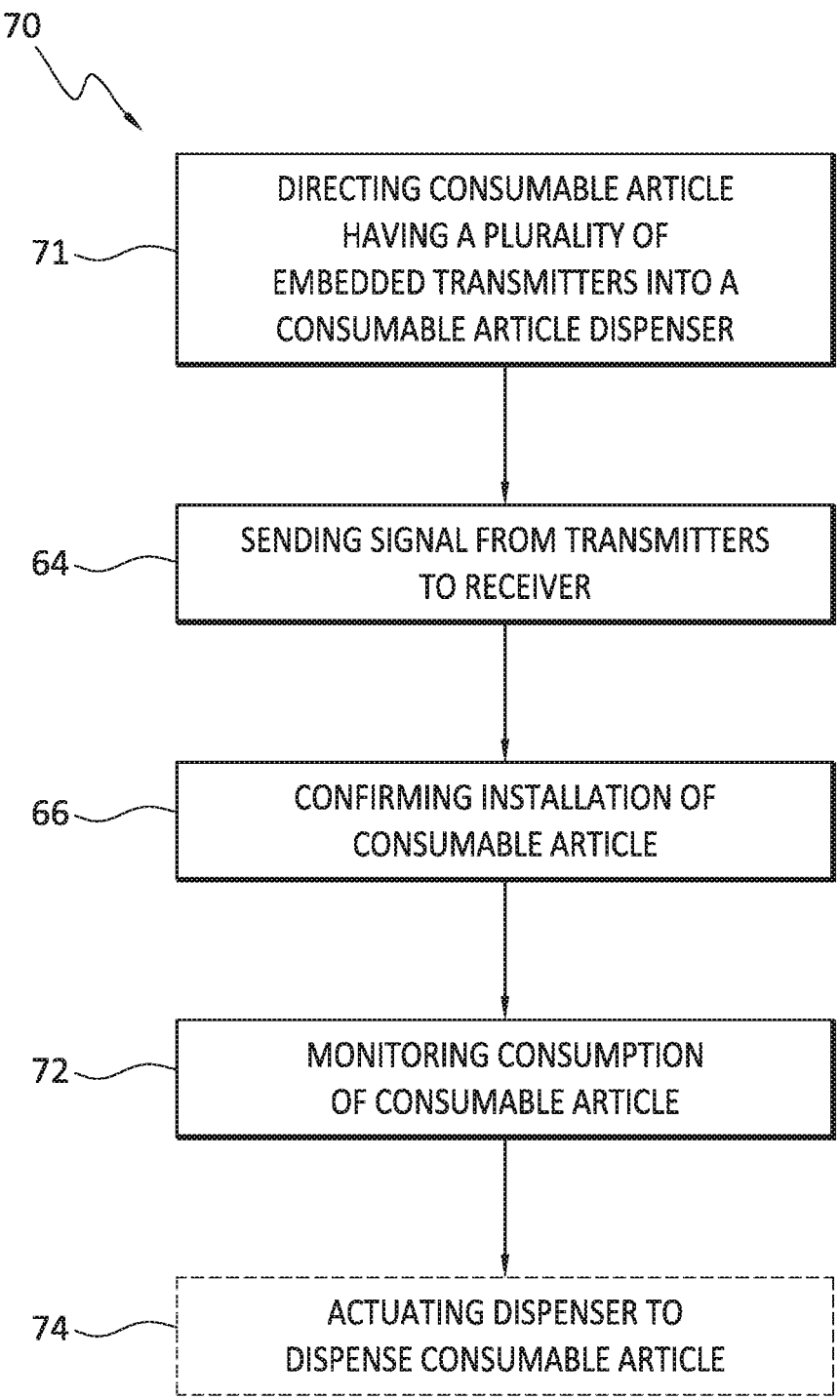

Having thus described variations of the disclosure in general terms, reference will now be made to the accompanying drawings, which are not necessarily drawn to scale, and wherein:

FIG. 1A is an illustration of an aspect of the present disclosure;

FIG. 1B is block diagram showing aspects of the present disclosure;

FIG. 2A is an illustration of an aspect of the present disclosure;

FIG. 2B is an illustration of an aspect of the present disclosure;

FIG. 2C is an illustration of an aspect of the present disclosure;

FIG. 2D is an illustration of an aspect of the present disclosure;

FIG. 2E is a flowchart outlining aspects of the present disclosure;

FIG. 3 is a block diagram showing aspects of the present disclosure;

FIG. 4 is a flowchart according to aspects of the present disclosure;

FIG. 5A is an illustration of a RFID unit used according to aspects of the present disclosure;

FIG. 5B is an illustration of a RFID unit used according to aspects of the present disclosure;

FIG. 6 is a block diagram outlining methods according to aspects of the present disclosure; and FIG. 7 is a block diagram outlining methods according to aspects of the present disclosure.

DETAILED DESCRIPTION

The present disclosure relates to systems, methods, and apparatuses for monitoring successful installation of consumable products (equivalently referred to herein as "consumable articles"), as well as monitoring the consumption (e.g., "usage") of consumable articles, including notification systems, methods, and apparatuses for alerting personnel to the need for replacing and/or servicing dispensers for consumable articles, in real-time.

According to present aspects, consumable articles include systems and physical features that allow a controlled and regulated association or "pairing" of a consumable article with a consumable article dispenser. That is, present aspects are directed to the physical dimensional pairing or "handshake" mating of a consumable article with a dispenser by providing consumer article registration characteristics (e.g. provided in the form of, e.g., one or more physical mating protrusions and recesses, etc.) in the consumable article and the associated registration characteristics (e.g. provided in the form of, e.g., one or more physical mating protrusions and recesses, etc.) in the dispenser into which the consumable article(s) are installed. In addition to the physical dimensional pairing of the consumer article and dispenser registration features, or characteristics, the consumable articles can further include at least one means for receiving and sending signals (e.g., transmitters, receivers, etc.) between the consumable article and an associated signal reader (e.g., a "data device") for the purpose of allowing, confirming, monitoring, etc., the installation and operation in real-time of, and/or confirming, monitoring, etc. in real-time, the status of the consumable article and consumable article supply and/or remaining supply in the course of consumable article usage (e.g., usage and/or amount of remaining consumable article supply, etc.) in the consumable article dispenser.

FIG. 1A shows a consumable article spool 10 for a consumable article (e.g., paper towel, toilet tissue, register tape, or any product that can be rolled onto a spool or spindle-type object, and then be unrolled for consumption and use by a user, etc.). The consumable article itself is not shown in FIG. 1A. The consumable article spool include a consumable article spool edge 12 that is deformed at predetermined location(s) about its perimeter, to establish at least one consumable article registration characteristic 14 that can be a protrusion, a notch, or a desired dimension and geometry designed to mate with, for example, a dispenser registration characteristic (not shown). While the consumable article registration characteristic 14 is shown as a "notch-like" recess having linear cuts joining to form right angles, any recess geometry (e.g., a V-notch, irregularly shaped recess, etc.) able to mate with a matching geometry on or in an "object" selected to receive the consumable article spool and useful according to present aspects is contemplated (e.g., wherein the "object" a dispenser registration characteristic, etc.). FIG. 1 further shows a RFID unit 16 (equivalently referred to herein as a RFID "chip") embedded into the consumable article spool inner surface 17 of consumable article spool 10, although it is understood that the RFID unit 16 can be adhered to the inner surface 17 of spool 10.

According to a present aspect, the physical recess that represents the consumable article registration characteristic 14 in consumable article spool 10 is dimensioned to mate with a similarly dimensioned dispenser registration characteristic (e.g., one or more protrusion or recess, etc.) in a consumable article dispenser (also equivalently referred to herein as a "dispenser", and not shown in FIG. 1A). The dispenser is dimensioned to receive the consumable article spool 10 onto which can be wound an amount of a consumable article. The physical mating or "pairing" of the consumable article spool and the consumable article associated with the consumable article spool into a designated and authorized dispenser represents a physical validating condition (e.g., a "pedigree verification" or "recognition") that confirms that an authorized replacement consumable article has been properly associated with a particular dispenser. In other aspects not shown, the consumable article may include a protrusion (rather than a recess as shown in FIG. 1A), and the dispenser dimensioned to receive the consumable article can include a mating recess (e.g., rather than a protrusion). In further aspects, the consumable article can include one or more of both a recess and a protrusion, with the dispenser including matching (mating) protrusions and recesses at locations in the dispenser designed and dimensioned to establish a mating "fit" with the recesses and protrusions found in the consumable article.

In addition, according to aspects of the present disclosure, a validating condition (referred to equivalently herein as a "pedigree verification" or "recognition") is confirmed through the signal (or return signal) sent from the RFID unit that is received by an RFID reader (not shown in FIG. 1A). According to further presently contemplated aspects, if a signal (e.g., a passive signal) sent from the RFID is not recognized by the RFID reader associated with the dispenser, the dispenser will not properly accept or confirm the presence of the consumable article, and/or the consumable article dispenser will not engage to an operable state (e.g., will not operate, etc.). In other words, present aspects contemplate confirming the presence of, for example, a sanctioned and authorized consumable article in a particular dispenser in real-time by: 1) providing unique physical mating attributes between the consumable article and receiving mechanisms in the associated dispenser for the consumable article; and 2) sending a signal (e.g., a passive signal) from a RFID located in the consumable article that is received by a RFID reader in the dispenser. If either confirming aspect "fails", the consumable article will not be accepted into position in the associated dispenser, and/or dispensed from the dispenser. If desired, according to further aspects, an alert is generated by, for example, a controller associated with the RFID reader to alert the status of the dispenser in real-time via activating an indicator. The indicator can be integrated into the dispenser and provide a visual, auditory (e.g., sound alarm) or other alert, and/or an alert can be sent to a remote location that can be accessed from a cloud-based data center via, for example, the Internet for the purpose of remotely monitoring the proper functioning of the dispenser.

According to a present aspect, as shown in FIG. 1B, a system 100 for monitoring a consumable article 104 is shown. The system 100 further comprises a dispenser 102 configured and dimensioned to at least partially house consumable article 104, with the consumable article comprising a consumable article registration feature (not shown in FIG. 1B) to facilitate. The dispenser can further comprise a dispenser registration feature (not shown) to facilitate an authorized or sanctioned mating of the consumable article with the dispenser registration feature and allowing a predetermined installation of the consumable article into the dispenser. Consumable article 104 further comprises at least one embedded transmitter 106 that can be an RFID unit. In another aspect, the embedded transmitter can be adhered to or otherwise located proximate to a surface of the consumable article, and/or a feature of the consumable article such as, for example, a roll onto which a consumable article is wound.

According to present aspects, the consumable article may or may not have a roll or other feature onto which the consumable product is wound. The consumable article can be in a stacked orientation including, for example, stacked, folded product such as paper towels, hand towels, tissues, toilet paper, etc. Further, present aspects have both an embedded transmitter located in or on the consumable product itself, and a transmitter can also be "embedded" in or on attendant structure that supports or contains the consumable article such as, for example, a roll, a cartridge, a packet, etc.

As further shown in FIG. 1B, system 100 further includes a receiver 108 configured to receive a signal sent from the embedded transmitter 106. The receiver 108 is shown in FIG. 1B as being integrated into dispenser 102. According to further aspects not shown, the receiver 108 can be incorporated into system 100, and also can be located remotely from the dispenser 102. The embedded transmitter 106 can further include a microprocessor circuit, and the embedded transmitter 106 can be frangible. Still further, dispenser 102 can optionally include a controller 112 that can optionally be integrated with or in communication with a motor 110. According to further aspects, the controller, when present, can be configured to receive signals from an embedded transmitter located in or a consumable article 104 and housed within dispenser 102. The system outlined in FIGS. 1A and/or 1B can employ the consumable articles described in the methods, systems, and apparatuses described at least in FIG. 1A, FIGS. 2A, 2B, 2C, 2D, 2E, 3, 4, 5A, 5B, 6, and 7.

According to further aspects, FIGS. 2A, 2B, 2C, and 2D (collectively referred to as "FIGS. 2A-2D") show a consumable article 20 shown in the form of a roll of paper towel (such illustrated paper towel representing a consumable article, in non-limiting fashion). As shown in FIG. 2A, the consumable article 20 is shown as a consumable article roll 22 having a plurality of consumable article segments 25 that together comprise an overall length of consumable article that, for example and as shown in FIGS. 2A-2D, can be wound about a consumable article spool 23. As shown, consumable article segments 25 are separable from one another, as the segments, as shown, include a perforation 24 located between, and otherwise defining a separable boundary between consumable article segments 25. A consumable article, according to present aspects, need not have perforations, or regularly spaced, discrete segments. Instead, and according to further present aspects, a consumable article may be continuous, and can have segments torn at random distances and locations along the length of the consumable article. In such cases, the perforation "line" as shown represents a region where various "lengths" of the consumable product is torn or severed from, for example, a roll of consumable article.

When force is applied, consumable article segments 25 can be separated from one another at and via perforations 24. As shown in FIGS. 2A-2D, a RFID unit 26a is placed astride perforation 24a such that a portion of RFID unit 26a contacts both segments 25a and 25a'. RFID units as shown in FIGS. 2A-2D are said to be frangible RFID units. RFID units contemplated herein further include a frangible RFID circuit (shown in greater detail in FIGS. 5A and 5B). According to present aspects, the RFID units are frangible RFID units that include at least one frangible RFID circuit that can be broken when a predetermined consumable article segment separating force is applied The RFID units send a passive signal to an associated RFID reader (not shown). For example, when a separating force is applied to consumable article segment 25a such that consumable article segment 25a is separated from consumable article segment 25a', RFID unit 26a is disturbed to a degree such that a circuit in RFID 26a is broken, and the signal previously sent from the unbroken RFID unit either changes, or ceases to be sent from the RFID unit. According to present aspect, the perforations in the consumable articles described throughout the present disclosure, according to present aspects, can occur at regular or semi-regular intervals, as desired to achieve the desired separation of segments of consumable articles occurring when a desired separating force is applied to the segment.

Although not shown in the FIGs., according to further present aspects, consumable articles that do not contain perforations can also include predetermined patterns or arrays of any desired number of RFID units (with such RFID units including frangible RFID circuits) positioned along and throughout the lengths of such "non-perforated" consumable articles. According to further present aspects, a supply of such non-perforated consumable articles can exist in rolls, folded stacks, etc. Such non-perforated consumable articles can be made from a material that is tearable (e.g. paper, thin films including plastic films and sheets, pulped sheets, fiber-containing materials, metal foils, cardboard, etc., or combinations thereof) by applying a manual force, or by applying a predetermined separating force to the consumable article, for example, by a machine including a machine that can be automated. In a further alternative, non-perforated consumable articles can be made from a more robust material that requires a separating force that can be applied to the consumable article in the form of a manual or machine operated and potentially automated severing or cutting tool, etc., (e.g., a blade or series of blades, a punch or series of punches, etc.) such that a predetermined length of consumable article can be cut, torn, or otherwise separated from the consumable article supply. As the predetermined length of non-perforated consumable article is separated from the consumable article supply, one or more RFID units present (e.g., embedded, affixed, etc.) along the length of the consumable article will sustain damage such that the frangible RFID circuit within the one or more frangible RFID units will be severed or otherwise "broken".

FIGS. 2A, 2B, 2C, and 2D illustrate an exemplary progression of consumable article usage from a "full" state shown in FIG. 2A to an "empty" or "near empty" state as shown in FIG. 2D. As shown in the "full" state illustrated in FIG. 2A, RFID unit 26a emits a passive signal to an associated RFID reader (not shown) in real-time. According to a present aspect, the signal can be unique to the specific RFID unit 26a, with the contained RFID circuit in RFID unit 26a responsible for sending a passive signal allowing an associated RFID reader to appreciate (e.g., recognize) the specific RFID unit and the condition of the specific RFID unit 26a. So long as the RFID unit 26a is intact at a particular position as shown in FIG. 2A, an RFID reader understands, and recognizes, that the consumable article is in a "full" state. The RFID reader can be in communication with a controller (not shown) that is in communication with an indicator 27, or the RFID reader may itself incorporate a controller and an indicator 27. Indicator 27 can include, for example, a series of indicator lights 27a, 27b, 27c, 27d (e.g., LED lights) that can be the same or different colors, and the indicator 27 can activate such that indicator lights 27a, 27b, 27c, 27d, for example, are all "ON" (e.g., all light up as shown in FIG. 2A) when the dispenser is full and indicating that the amount of the consumable article is in a full or near-full state.

As the usage of the consumable article continues (e.g., as the consumable article continues to be progressively "consumed" by users, etc.), FIG. 2B shows the next stage in the "usage progression". As shown in FIG. 2B, a RFID unit 26b is placed astride perforation 24b such that a portion of RFID unit 26b contacts both segments 25b and 25b'. As shown in FIG. 2B, RFID unit 26b emits a passive signal to an associated RFID reader (not shown). According to a present aspect, the signal includes features unique to the specific RFID unit 26b, with the contained circuit in RFID unit 26b responsible for sending a passive signal allowing an associated RFID reader to appreciate the condition of the RFID 26b. So long as the RFID unit 26b is intact at a particular position as shown in FIG. 2B, an RFID reader understands that the consumable article is in a state of about "25% usage", (e.g., 25% of the consumable article has been used, etc.). The RFID reader can be in communication with a controller (not shown) that is in communication with an indicator 27, or the RFID reader may itself incorporate a controller and an indicator 27. As shown in FIG. 2B, the indicator 27 now displays indicator lights 27b, 27c, and 27d in an "ON" mode (e.g., light 27a is now "OFF"), indicating a consumable article state of about 25% "used" (or about 75% full).

As the usage of the consumable article continues (e.g., as the consumable article continues to be progressively "consumed" by users, etc.), FIG. 2C shows the next stage in the "usage progression". As shown in FIG. 2C, a RFID unit 26c is placed astride perforation 24c such that a portion of RFID unit 26c contacts both segments 25c and 25c'. As shown in FIG. 2C, RFID unit 26c emits a passive signal to an associated RFID reader (not shown). According to a present aspect, the signal includes features unique to the specific RFID unit 26c, with the contained circuit in RFID unit 26c responsible for sending a passive signal allowing an associated RFID reader to appreciate the condition of the RFID 26c. So long as the RFID unit 26c is intact at a particular position as shown in FIG. 2C, an RFID reader understands that the consumable article is in a state of about "50% usage", (e.g., 50% of the consumable article has been used, etc.). The RFID reader can be in communication with a controller (not shown) that is in communication with an indicator 27, or the RFID reader may itself incorporate a controller and an indicator 27. As shown in FIG. 2C, the indicator 27 now only displays indicator lights 27c, and 27d in an "ON" mode (e.g., lights 27a and 27b are now "OFF"), indicating a consumable article state of about 50% "used" (or about 50% full).

As the usage of the consumable article continues (e.g., as the consumable article continues to be progressively "consumed" by users, etc.), FIG. 2D shows the next stage in the "usage progression". As shown in FIG. 2D, a RFID unit 26d is placed astride perforation 24d such that a portion of RFID unit 26d contacts both segments 25d and 25d'. As shown in FIG. 2D, RFID unit 26d emits a passive signal to an associated RFID reader (not shown). According to a present aspect, the signal includes features unique to the specific RFID unit 26d, with the contained circuit in RFID unit 26d responsible for sending a passive signal allowing an associated RFID reader to appreciate the condition of the RFID 26d. So long as the RFID unit 26d is intact at a particular position as shown in FIG. 2D, an RFID reader understands that the consumable article is in a state of at least about "75% usage" (e.g., at least about 75% of the consumable article has been used, etc.). The RFID reader can be in communication with a controller (not shown) that is in communication with an indicator 27, or the RFID reader may itself incorporate a controller and an indicator 27. As shown in FIG. 2D, the indicator 27 now only displays indicator light 27d in an "ON" mode (e.g., lights 27a, 27b, and 27c are now "OFF"), indicating a consumable article state of about 75% "used" (or about 25% full).

FIG. 2E is an illustrative flow chart describing the steps of operation according to a present aspect. As shown in FIG. 2E, a monitoring and assessment operation 200 begins (as indicated by "Start" 201) by determining the proper installation or inclusion of a sanctioned consumable part 202. As shown in step 202, a RFID chip (RFID 1) is embedded (e.g., or otherwise affixed or adhered) in a consumable roll (e.g., a cardboard roll). In step 204, if the installation or inclusion of a consumable product is improper, has not been accomplished successfully, is not sanctioned for use, etc., no signal will be received by an antenna, or an incorrect or error signal will be received by an antenna. Step 206 shows a signal received from RFID 1, with the antenna receiving a correct signal and sending a confirmatory signal to a microprocessor (e.g., indicating that the consumable product was installed properly and should be accepted, that installation or inclusion of a consumable product is proper, or has been accomplished successfully, and is otherwise sanctioned for use, etc.). According to optional step 208, in an aspect contemplating e.g., a hands free paper towel dispenser, a dispenser motor can be enabled. The operation outlined in FIG. 2E further shows in step 210 that an additional RFID, (RFID 2), is located within the consumable product (e.g., RFID 2 is contained at a predetermined location within consumable product), for example, at a location representing 0% to 25% usage. If RFID 2 is intact (e.g., the circuit in RFID 2 is not broken), a signal can be sent by an intact antenna indicating that less 25% usage of the consumable product (e.g., 0% to 25% consumable product usage; or stated another way, 75% to 100% of the consumable product remains available to be used, etc.). Indicator 210a can be engaged to display and otherwise evidence a degree of supply of greater than 75% "full". If RFID 2 or a circuit within RFID 2 is broken, as indicated by step 210b, the system will understand that more than 25% of the consumable product has been "used".

Further, as shown in FIG. 2E at step 212, an additional RFID, (RFID 3), is located within the consumable product (e.g., RFID 3 is contained at a predetermined location within consumable product), for example, at a location representing 25% to 50% usage of the consumable product. If RFID 3 is intact (e.g., the circuit in RFID 3 is not broken), a signal can be sent by an intact antenna indicating that less than to 50% of the consumable product has been used (e.g., an amount greater than 50% of the consumable product remains available to be used, etc.). Indicator 212a can be engaged to display and otherwise evidence a degree of supply of greater than 50% "full". If RFID 3 (or a circuit and/or antenna within RFID 3) is broken, as indicated by step 212b, the system will understand that more than 25% of the consumable product has been "used".

Further, as shown in FIG. 2E at step 214, an additional RFID, (RFID 4), is located within the consumable product (e.g., RFID 4 is contained at a predetermined location within consumable product), for example, at a location representing 50% to 75% usage of the consumable product. If RFID 4 is intact (e.g., the circuit and/or antenna in RFID 4 is not broken), a signal can be sent by an intact circuit and/or antenna indicating that more than to 50% of the consumable product has been used (e.g., an amount less than 50% of the consumable product remains available to be used, etc.). Indicator 214a can be engaged to display and otherwise evidence a degree of supply of less than 50% "full". If RFID 4 (or a circuit and/or antenna within RFID 4) is broken, as indicated by step 214b, the system will understand that more than 50% of the consumable product has been "used".

As shown in FIG. 2E at step 216, an additional RFID, (RFID 5), is located within the consumable product (e.g., RFID 5 is contained at a predetermined location within consumable product), for example, at a location representing more than 75% usage of the consumable product. If RFID 5 is intact (e.g., the circuit and/or antenna in RFID 5 is not broken), a signal can be sent by an intact circuit and/or antenna indicating that an amount of more than, for example, about 25% of the consumable product has been used (e.g., an amount less than 25% of the consumable product remains available to be used, etc.). Indicator 216*a* can be engaged to display and otherwise evidence a degree of supply of less than 25% "full". If RFID 5 or a circuit within RFID 5 is broken, as indicated by step 216*b*, the system will understand that more than 50% of the consumable product has been "used". If RFID 5 in step 216 is placed toward, for example, the end of a roll, or a stack of conjoined but separable consumable product (e.g. stacked, folded paper towel sections, etc.), and a circuit or antenna associated with RFID 5 is broken, a signal can be sent to represent (or the absence of signals sent from RFID 2, RFID 3, RFID 4, and RFID 5 to represent) that the contained supply of consumable product being monitored is nearly "empty", and/or that 100% or nearly 100% of the consumable product has been used. When the last RFID present in a supply of consumable product (or a frangible portion of the RFID such as, for example, an antenna or a circuit in the RFID) is "broken", according to one aspect, signals no longer will be generated or sent by the RFIDs, indicating that 100% of consumable product had been used. In such aspects, a dispenser housing consumable products being monitored for usage will be considered to be "empty", with the supply of consumable product housed in such a dispenser being exhausted or completely depleted. The systems and apparatuses shown in FIGS. 2A, 2B, 2C, 2D, and 2E employ the consumable articles described in the methods, systems, and apparatuses described at least in FIGS. 1A, 1B, 3, 4, 5A, 5B, 6, and 7.

As noted elsewhere herein, RFIDs (also referred to equivalently herein as "RFID strips) may be discrete strips. Although not shown, the discrete strips can be oriented (e.g., longitudinally) on or within the consumable product being monitored so as to overlap one another, or can be oriented (e.g., longitudinally) so as to not overlap one another, as shown. Further, although not shown, a strip that is continuous, (e.g., one strip that is oriented on or within substantially the entire length of a consumable product supply) can comprise multiple (e.g., frangible) RFIDs oriented (e.g., "back-to-back") along or within the continuous strip. The RFIDs may themselves be frangible or may comprise components that can be frangible (e.g., a frangible antenna, a frangible circuit, etc.). In this and other aspects, the continuous RFID can be configured in discrete or overlapping orientation, with each RFID configured to extend to a length ranging from about 6" to about 10". According to further aspects, continuous and discrete RFIDs (e.g., continuous and discrete strips comprising RFIDs) are oriented on or within the consumable product being monitored such that, for example, a portion (e.g., a frangible portion) of the RFID(s) bridge a contemplated or predetermined "tear zone". The "tear zone" can, but need not comprise perforations for the purpose of facilitating severing a section of the consumable product from a consumable product supply.

FIG. 3 is a box diagram illustrating systems and apparatuses according to present aspects. As shown in FIG. 3, system 30 includes RFID unit 32 having an antenna 33. RFID unit 32 sends passive signals via antenna 33 to RFID reader with microprocessor 34 that can incorporate one or more microprocessors to receive and read the signals sent from RFID unit 32. RFID reader 34 is shown in communication with indicator 35 that can include a controller (not shown). RFID reader 34 is optionally further in communication with an activating mechanism 36 (e.g., a motor, etc.) that can be a motor for the purpose of advancing, for example, a predetermined amount of consumable article from system 30. The systems and apparatuses shown in FIG. 3 employ the consumable articles described in the methods, systems, and apparatuses described at least in FIGS. 1A, 1B, 2A through 2E, 4, 5A, 5B, 6, and 7.

FIG. 4 is a box diagram of a consumable article 40 according to further aspects of the present disclosure. As shown in FIG. 4, a consumable article 40 includes a consumable article spool 41 including the features described for consumable article spool 10 and as shown in FIG. 1. Consumable article spool 41 further includes a RFID unit (equivalent to RFID unit 16 as shown in FIG. 1 embedded into an inner surface of consumable article spool 41, although it is understood that the RFID unit can be adhered to the inner surface of consumable article spool 41. As shown in FIG. 4, consumable article 40 further includes a plurality of tearable or severable (equivalently referred to herein as frangible) RFID units 42, 43, 44, and 45 that are positioned at stages throughout the spooled consumable article as described in FIGS. 2A, 2B, 2C, and 2D. The tearable RFID units are shown in FIG. 4 as RFID 2 (42); RFID 3 (43); RFID 4 (44); and RFID 5 (45), with RFID 1 shown as contained within the consumable article spool 41.

As described above and shown in FIG. 1 (with respect to consumable article spool 10), consumable article spool 41 as shown in FIG. 4, further includes a consumable article registration characteristic (shown as physical recesses or notches) in consumable article spool 41 that are dimensioned to mate with similarly dimensioned dispenser registration characteristics (e.g., protrusions) in a dispenser (not shown) designed to receive the consumable article spool 41 onto which is wound an amount of a consumable article. The physical mating of the consumable article spool and the consumable article associated with the consumable article spool into a designated and authorized dispenser represents a physical validating condition that confirms that an authorized replacement consumable article has been properly associated with a particular dispenser. The systems and apparatuses shown in FIG. 4 employ the consumable articles described in the methods, systems, and apparatuses described at least in FIGS. 1A, 1B, 2A though 2E, 3, 5A, 5B, 6, and 7.

According to further aspects, FIGS. 5A and 5B show an enlarged representation of RFID units incorporated into the consumable articles disclosed herein. As shown in FIG. 5A, RFID unit 50 includes a superimposed frangible RFID circuit 53 that can emit a passive signal via an antenna that can be incorporated into frangible RFID circuit 53. RFID unit 50 is shown bridging a portion of consumable article segments 52*a* and 52*b*. Perforation 54 is positioned at a mutual boundary of consumable article segments 52*a* and 52*b*. In the configuration shown in FIG. 5A, the consumable article segments 52*a* and 52*b* have not been separated from one another, and the RFID unit 50 and frangible RFID circuit 53 are "intact" and able to emit a passive signal.

FIG. 5B illustrates the RFID unit 50 shown in FIG. 5A with consumable article segments 52*a* and 52*b* now separated from one another. The force that is applied to separate the consumable article segments 52*a* and 52*b* from one another is sufficient to rupture, sever, or break the frangible RFID circuit 53 as indicated by frangible RFID circuit ends 53*a* 53*b*, 53*c*, 53*d* now shown in FIG. 5B as a frangible ID circuit 53 that is now in a "broken" orientation, or otherwise "broken". In this broken orientation, RFID unit 50 (as well as the frangible RFID circuit 53) is no longer able to emit a passive signal to, for example, an associated RFID reader dedicated to recognize an associated RFID unit and RFID circuit in such RFID unit. According to present aspects, so long as the RFID circuit 53 is frangible, the RFID unit itself can also be frangible. The systems and apparatuses shown in FIGS. 5A and 5B employ the consumable articles described in the methods, systems, and apparatuses described at least in FIGS. 1A, 1B, 2A through 2E, 3, 4, 6, and 7.

FIG. 6 is a flowchart outlining a method 60 according to present aspects including directing 62 a consumable article into a dispenser, with the consumable article having at least one embedded transmitter and possibly a plurality of embedded transmitter, sending 64 a signal from the embedded transmitter(s) to a receiver, and confirming 66 installation of the consumable article into the dispenser. The method outlined in FIG. 6 employs the consumable articles described in the methods, systems, and apparatuses described at least in FIGS. 1A, 1B, 2A through 2D, 3, 4, 5A, 5B, and 7.

FIG. 7 is a flowchart outlining a method 70 according to present aspects, including directing 71 a consumable article into a dispenser, with the consumable article having a plurality of embedded transmitters, sending 64 a signal from the transmitter to a receiver, article and confirming 66 installation of the consumable article into the dispenser, monitoring 72 consumption of a consumable article, and optionally actuating 74 a mechanism in the dispenser to dispense the consumable. The method outlined in FIG. 7 employs the consumable articles described in the methods, systems, and apparatuses described at least in FIGS. 1A, 1B, 2A through 2D, 3, 4, 5A, 5B, and 6.

According to present aspects, the RFID circuits in the RFID units can be passive, meaning that the present RFID units need not include an internal power source. Alternatively, the RFID circuits can be active and include an internal power source. Passive RFIDs are particularly desirable according to present aspects since they require no power source of their own, and instead rely on an RFID reader as their power source. That is, the associated or dedicated RFID reader (associated with and configured to receive the signals sent from a particular RFID unit, or group of RFID units) sends a signal with a query, and the RFID circuit both receives the signal and draws electrical power from the signal. The RFID circuit then sends a response to the query, using the electrical energy derived from the received signal to power the return transmission to the reader from the RFID circuit. The useful transmission range depends on both the power of the RFID reader and the configuration of the RFID circuit. Passive RFID circuits of the type that can be read up to about 20 feet (about six meters) away are considered suitable according to present aspects, though combinations having different power and broadcast ranges can be used. Advantageously, passive RFID circuits and devices have a relatively low production cost and are simple and reliable.

The RFID unit can comprise a RFID processor unit that typically includes a small, special purpose processor and system memory, along with power-related circuitry for receiving and using transmitted power to perform microprocessor functions and send a return signal. When a signal is received (e.g., by an antenna integrated into or in communication with the RFID unit, etc.), reception of the signal generates energy that is used by the RFID processor unit. The data content of the received signal can be acted upon by the RFID processor that further determines whether to store, retrieve, or manipulate data stored in a memory that can be an integrated memory or a remote memory. A return signal is then sent from the RFID unit via the antenna, using the energy from the received signal.

According to present aspects, at least one portion of the RFID circuit of an RFID unit, such as, for example, an antenna or other portion of the RFID circuit, extends over (e.g., "bridges") consumable article segments (of the consumable article) that adjoin a separable boundary (e.g., perforation or perforated region, etc.). As the consumable article is (e.g., progressively over time) accessed by a user, the consumable article segments are detached from one another and the frangible RFID circuit bridging the adjoining consumable article segments that are detached from one another will be severed and the frangible RFID circuit will no longer be able to receive, process, or transmit a return signal to the RFID reader. The cessation of the return signal from the RFID circuit evidences that a particular amount of consumable article has been consumed, as the RFID reader no longer receives a return signal from the RFID unit that has been severed (e.g., has had its RFID circuit severed), and typically no longer is contained within the consumable article supply.

According to present aspects, typical RFID units (equivalently referred to herein as "RFID chips"), RFID readers, RFID reader chips, RFID antennas, RFID software, etc., that are commercially available are contemplated. In addition special-purpose or customized RFID units can be made and used and incorporated (e.g. embedded, affixed, etc.) into consumable articles, according to further present aspects.

The indicator can represent the entirety of or can be a part of a user interface. The user interface, RFID reader, antenna, etc., in combination, can equivalently be referred to herein as a "data device"; whether or not the components are physically combined together in a single device, or in separate elements that are used together and/or are in communication with one another. The term "data device" is further used to encompass any user interface device, whether fixed or mobile, that is used in conjunction with a RFID reader and an antenna to query and receive return signals from a RFID unit and/or more particularly a RFID circuit.

The user interface can be a mobile device, such as a tablet, computer, phone, or the like, and can include a microprocessor and system memory and is provided with appropriate software. In one aspect, an antenna and reader can be incorporated into a USB device that attaches to the tablet, computer, etc., allowing a general use tablet, computer, etc., combined with the USB device to include components and perform functions of the data device. Alternatively, the data device can be a special purpose device that includes the antenna, reader and user interface together. In another alternative, the user interface and/or the reader and/or the antenna can be incorporated into a fixed data device that can be located at a particular location that can be a location that is remote from the RFID units and the consumable article dispenser.

According to an aspect, when the present systems are in use, each RFID associated with a separation boundary of a consumable article supply is effectively "scanned" using the data device that send signals to the RFID units. A return signal sent from the RFID units is received by the reader in the data device and, if desired, is stored by the data device. Scanning, detecting and collecting return signals from the RFID units in the consumable articles can involve querying the RFID units via the RFID reader and the data device and receiving return signals in response from the RFID units.

The present apparatuses, systems, and methods pertain to the installation, monitoring and dispensing of consumable articles. Such consumable articles include any product that can be dispensed in any form including the dispensing of articles from rolls, stacks, sheets, etc., so long as a frangible RFID-type unit, or equivalent detection and signaling unit, can be attached between and among attached or discrete segments, sheets, etc., and that can be ruptured or severed etc., such that, for example, an internal circuit can be broken to evidence that a particular portion of a consumable article supply has been consumed. In addition, according to present aspects, matching or associated RFID unit and RFID readers with compatible signal sending/receiving functions are present for the purpose of authorizing, allowing, confirming, etc. that proper installation of a consumable article supply (including a replacement supply, etc.) into an associated dispenser has occurred.

A non-exhaustive list of consumable articles that can be installed and/or dispensed according to present aspects include, for example, carpet, carpet underlay, linoleum, textile fabric roll, plastic wrap, plastic moisture barrier, adhesive tapes, foam, rubber/latex, sheet metal, wiring, chain link, rope, cable, electrical wiring, fiber optic cable, PVC roofing membrane, metal/plastic extrusions, painters tape, hook and loop material (Velcro®), tapes, including duct tape, tint film, sand paper, flat bar, aluminum foil, printing press paper, voucher/coupon/ticket roll, take a number (customer next ticket), toilet paper, boarding pass, concert ticket, bus/train/ferry ticket, artificial turf, canvas, wall paper, laminate, carbon fiber, fiberglass (from thin reinforcement sheet to thick insulation bats), bubble wrap, cardboard, bitumen paper, vinyl sheet (flooring and cladding), wrapping paper, banking/treasury paper roll (checks, paper/polymer bank notes, bonds, certificates/titles/deeds), photographic paper, etc.

The aforementioned non-exhaustive list of consumable articles can be installed into mechanisms, including, for example, dispensers and have proper installation confirmed according to presently described aspects. Further, the aforementioned non-exhaustive list of consumable articles can include the embedded transmitters described herein for the purpose of assisting in the monitoring of various characteristics of the consumable articles, in real-time; such characteristics including, for example, the supply available, the usage, the rate of usage, etc., of the consumable article.

Consumable articles, according to present aspects, can be associated with a dispenser, with such dispenser able to be operated manually or automatically. Consumable articles, according to present aspects, can also deploy predetermined and desired lengths (e.g., from a spool, etc.) manually or automatically in association with a simplified device not traditionally considered to be a dispenser such as, for example, a spindle, etc. According to further aspects, such spindle or dispenser can be oriented vertically or horizontally to dispense the consumable article.

According to further aspects, the methods, apparatuses, and systems described herein, further find utility when they are incorporated into larger structures and objects, including, for example, rooms in buildings, such as lavatories, kitchens, garages, etc.

According to further aspects, such larger structures and objects further include, for example and without limitation, manned and unmanned spacecraft, manned and unmanned aircraft, manned and unmanned hovercraft, manned and unmanned rotorcraft, manned and unmanned terrestrial vehicles, manned and unmanned surface watercraft, manned and unmanned sub-surface watercraft, manned and unmanned satellites, etc., and combinations thereof.

Aspects of the present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A system comprising:
   an authorized consumable article comprising:
   an amount of the authorized consumable article associated with a spool, said authorized consumable article comprising a plurality of adjacent authorized consumable article segments, said spool comprising an edge perimeter to form at least one physical authorized consumable article registration characteristic at the edge perimeter, said physical authorized consumable article registration characteristic comprising an authorized consumable article recess geometry comprising at least one of a recess, a protrusion, or combinations thereof;
   an embedded transmitter in the authorized consumable article, said embedded transmitter in the authorized consumable article configured to send an authorized consumer article validation signal from the authorized consumable article;
   an RFID unit, said RFID unit comprising a frangible RFID circuit, said RFID unit configured to emit a RFID unit signal in an intact state, said RFID unit positioned within an authorized consumable article, and said RFID unit further positioned to bridge a portion of at least two of the adjacent authorized consumer article segments;
   an RFID reader dedicated to recognize the RFID unit signal from the RFID unit when said frangible RFID circuit is in the intact state in the RFID unit;
   a dispenser comprising:
   at least one physical dispenser registration characteristic, said dispenser registration characteristic comprising at least one of a recess, a protrusion, or combinations thereof, said dispenser registration characteristic dimensioned and configured to establish an authorized pairing of the dispenser with the recess geometry of the authorized consumable article;
   a receiver, said receiver configured to receive the authorized consumer article validation signal sent from the embedded transmitter in the authorized consumable article;
   wherein the authorized pairing of the dispenser registration characteristic with the authorized consumable article registration characteristic is configured to represent a physical validating condition;
   wherein receipt of the signal by the receiver in the dispenser sent by the embedded transmitter in the authorized consumable article is configured to validate the authorized consumable article for installation of the authorized consumable article into the dispenser;
   wherein upon satisfying both the physical validating condition and the signal validating condition only the authorized consumable article is allowed to be received into the dispenser and the dispenser is placed into an operable state; and
   wherein a perceived interruption of the frangible RFID unit signal by breaking of the RFID unit bridging the portions of the at least two adjacent authorized article segments causes an indicator of the dispenser to display a predetermined percentage usage of the authorized consumer article.

2. The system of claim 1, wherein the authorized consumer article validation signal is a passive signal.

3. The system of claim 1, wherein the embedded transmitter in the authorized consumable article comprises an RFID unit.

4. The system of claim 1, wherein the authorized consumable article comprises a rolled authorized consumable article.

5. The system of claim 1, wherein the embedded transmitter in the authorized consumable article comprises a microprocessor circuit.

6. The system of claim 1, wherein the system further comprises a controller, said controller in communication with the receiver.

7. The system of claim 6, wherein the system further comprises a motor, said motor in communication with the controller.

8. The system of claim 6, wherein the controller is configured to receive signals from the embedded transmitter in the authorized consumable article.

9. The system of claim 1, wherein the RFID unit signal is a passive RFID unit signal.

10. A consumable article comprising:
an authorized consumable article, said authorized consumable article comprising:
an embedded transmitter in the authorized consumable article, said embedded transmitter in the authorized consumable article configured to send a validating signal sent by the embedded transmitter in the authorized consumable article to a receiver of an RFID reader within an authorized dispenser of the authorized consumable article to confirm a signal validating condition, said authorized consumable article comprising a plurality of adjacent authorized consumable article segments;
a spool, said spool comprising an edge perimeter, said edge perimeter configured to form at least one physical consumable article registration characteristic at the edge perimeter, said physical authorized consumable article registration characteristic comprising an authorized consumable article recess geometry, said authorized consumable article recess geometry comprising at least one of a recess, a protrusion, or combinations thereof, said physical authorized consumer article registration feature further configured to obtain an authorized pairing with the authorized dispenser;
wherein placing the authorized consumer article into the authorized dispenser places the authorized dispenser in an operable state after the signal validating condition is confirmed and the authorized pairing is obtained;
an RFID unit, said RFID unit comprising a frangible RFID circuit, said RFID circuit configured to emit a RFID unit signal in an intact state, said RFID unit positioned within an authorized consumable article, and said RFID unit further positioned to bridge a portion of at least two of the adjacent authorized consumer article segments;
an;
wherein the RFID unit outputs a signal to an RFID reader within the dispenser when the frangible RFID circuit is in the intact state in the RFID unit;
wherein the RFID unit outputs the validating signal to the receiver;
and
wherein a perceived interruption of the passive RFID unit signal by breaking the RFID unit bridging the portions of the at least two adjacent authorized consumer article segments causes a signal to be sent to an indicator, said indicator integral with or in communication with the dispenser to display a predetermined percentage usage of the authorized consumer article.

11. The consumable article of claim 10, wherein the embedded transmitter in the authorized consumable article is an RFID chip.

12. The consumable article of claim 10, wherein the authorized consumable article comprises a rolled configuration.

13. The consumable article of claim 10, wherein the embedded transmitter in the authorized consumable article comprises a microprocessor circuit.

14. The consumable article of claim 10, wherein the dispenser is in communication with a remote receiver.

15. An object comprising the authorized consumable article of claim 10.

16. The object of claim 15, wherein the object is a vehicle, said vehicle selected from the group consisting of: a manned aircraft, an unmanned aircraft, a manned spacecraft, an unmanned spacecraft, a rotorcraft, an unmanned rotorcraft, a drone, a satellite, a manned terrestrial vehicle, an unmanned terrestrial vehicle; a manned surface marine vehicle, an unmanned surface marine vehicle, a manned sub-surface marine vehicle, an unmanned sub-surface marine vehicle, and combinations thereof.

17. The consumable article of claim 10, wherein the RFID unit signal is a passive RFID unit signal.

18. A method comprising:
authorizing installation of an authorized consumable article into a dispenser, said authorized consumable article comprising:
a plurality of adjacent authorized consumable article segments;
a spool, said spool comprising an edge perimeter, said edge perimeter configured to form at least one physical authorized consumable article registration characteristic at the edge perimeter, said physical authorized consumable article registration characteristic comprising an authorized consumable article recess geometry comprising at least one of a recess, a protrusion, or combinations thereof;
an embedded transmitter in the authorized consumable article, said embedded transmitter in the authorized consumable article configured to send a signal from the embedded transmitter in the consumable article to a receiver;
wherein said dispenser comprises:
at least one physical dispenser registration characteristic, said dispenser registration characteristic comprising at least one of a recess, a protrusion, or combinations thereof, said dispenser registration characteristic dimensioned and configured to establish a mating fit with the authorized consumable article recess geometry;
a receiver configured to receive the signal sent from the embedded transmitter in the authorized consumable article;
confirming a physical validating condition by establishing an authorized pairing of the dispenser registration characteristic with the physical consumable article registration characteristic;
receiving the signal sent by the embedded transmitter in the authorized consumable article;
confirming a signal validating condition established by receipt of the signal by the receiver in the dispenser;
validating the authorized installation of the authorized consumable article in the dispenser;

placing the dispenser in an operable state resulting from both the confirming of the physical validating condition and the confirming of the signal validating condition;

orienting an RFID unit into the authorized consumable article, said RFID unit comprising a frangible RFID circuit, said RFID circuit configured to emit an RFID unit signal in an intact state, said RFID unit positioned within an authorized consumable article, and said RFID unit further positioned to bridge a portion of at least two of the adjacent authorized consumer article segments;

providing an RFID unit reader, said RFID unit reader in receiving communication with the RFID unit, said RFID reader configured and dedicated to recognize the RFID unit signal in the RFID unit when said frangible RFID circuit is in the intact state; and determining a predetermined percentage usage by perceiving an interruption of the frangible RFID unit signal upon breaking the RFID unit bridging the portion of the at least two adjacent authorized consumer article segments, and displaying the predetermined percentage usage by an indicator, said indicator integral with or in communication with the dispenser.

19. The method of claim 18, wherein the RFID unit signal is a passive RFID unit signal.

20. The method of claim 18, further comprising:
rupturing the frangible RFID circuit in the RFID unit to form a ruptured RFID unit.

21. The method of claim 20, further comprising: interrupting the frangible RFID circuit signal.

22. The method of claim 21, further comprising: determining a predetermined percentage usage of the authorized consumer article, said predetermined percentage usage of the authorized consumable article corresponding to a location of the ruptured RFID unit within the authorized consumable article.

23. The method of claim 21, wherein the frangible RFID circuit signal is a passive signal.

24. The method of claim 18, further comprising: activating the dispenser to an operable state.

25. The method of claim 18, further comprising: monitoring consumption of the consumable article in real-time.

26. The method of claim 25, the step of monitoring the consumption of the authorized consumable article further comprising: monitoring consumption of the consumable article at a location remote from the dispenser.

27. The method of claim 18, further comprising: monitoring a condition of the embedded transmitter at a location remote from the dispenser.

* * * * *